(12) United States Patent
McGowan

(10) Patent No.: US 7,277,419 B2
(45) Date of Patent: Oct. 2, 2007

(54) SUPPORTING DISPARATE PACKET BASED WIRELESS COMMUNICATIONS

(75) Inventor: Steven B. McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1075 days.

(21) Appl. No.: 10/231,712

(22) Filed: Aug. 30, 2002

(65) Prior Publication Data

US 2004/0042440 A1 Mar. 4, 2004

(51) Int. Cl.
*H04J 3/00* (2006.01)
*H04J 3/04* (2006.01)

(52) U.S. Cl. ............... 370/345; 370/349; 370/392; 370/535

(58) Field of Classification Search ......... 370/329, 370/345, 468, 474–476, 532, 535, 537, 389, 370/392, 349, 466
See application file for complete search history.

(56) References Cited

U.S. PATENT DOCUMENTS 6,172,972 B1 * 1/2001 Birdwell et al. ............ 370/349
2002/0150100 A1 * 10/2002 White et al. ................ 370/392

OTHER PUBLICATIONS

Bluetooth Specification Version 1.1, Logical Link Control and Adaptation Protocol Specification (L2CAP), Part D, pp. 255-1084.

Part 11: Wireless LAN Medium Access Control (MAC) and Physical Layer (PHY) Specifications, ANSI/IEEE Std. 802.11, 1999 Edition, pp. 1-85.

* cited by examiner

*Primary Examiner*—Afsar Qureshi
(74) *Attorney, Agent, or Firm*—Trop, Pruner & Hu, P.C.

(57) ABSTRACT

Channel multiplexing and flow control may be incorporated in wireless communications, especially in short-range wireless communication systems. In one embodiment, a wireless communication system may include a source and a target transceiver to communicate data over a wireless communication link, such as a radio link. At the source transceiver, a first payload of data may be broken into one or more first fragments to control multiplexing of the one or more first fragments. To communicate the first payload, each first fragment may be labeled as at least one of a beginning and an ending fragment. Likewise, a second payload of data may be broken into one or more second fragments. Each second fragment may be identified as at least one of a start, intermediate, end or a single fragment. Each of the first and second fragments may be sized to control latency. While the first payload of data may be provided on a first channel, the second payload of data may be provided on a second channel. By advantageously arbitrating transmission of the first and second fragments, the first and second channels may be multiplexed at a fragment granularity rather than at a payload granularity, providing finer control of payload latency and a more robust short-range wireless communication link.

23 Claims, 6 Drawing Sheets

SUPPORTING DISPARATE PACKET BASED WIRELESS COMMUNICATIONS

BACKGROUND

This invention relates to wireless communication systems, and more particularly, to supporting disparate packet based wireless communications.

In a wireless communication system, voice, video, and/or data may be communicated between applications in one or more data units, such as payloads. Each payload may be broken into one or more packets of data that may be exchanged between wirelessly networked devices or systems. However, a wireless transfer of packets, and/or payloads over a short-range communication link may be difficult because wireless communications not only have to be low-power but also have to be able to overcome interference and fading while providing wireless communications comparable to wireline data transmission rates and reliability. To address some of these constraints while providing a short-range communication link between a source and a target transceiver, a managed flow of data within a channel is generally provided from the sending end to the receiving end on a wireless link. Particularly, to expedite the flow of the data in channels across a wireless link, data multiplexing and flow control schemes are commonly used, among other techniques. However, providing multiple data channels on a single wireless link may be inefficient because the data transfers of one channel may be blocked by those of another channel, causing delays of data on high priority channels.

Specifically, modern wireless communications systems support the negotiation of Quality of Service (QoS) agreements for individual channels on a wireless link. The latency and bandwidth of a channel are two QoS parameters that are typically negotiated. Inefficient multiplexing may make it impossible to reliably control the latency or bandwidth of a channel. For example, if channel data is multiplexed in payload sized entities, then the transmission of one payload must be completed before the another payload can be started. If the transmission of a large, low priority payload is started and immediately after that a high priority payload is scheduled, then the transmission of the high priority payload will be delayed until the low priority payload is complete. This delay could jeopardize the ability of the system to meet the agreed upon QoS parameters.

Inadequate flow control may result in unacceptable delays and/or even a loss of data. For example, a packet of data of a payload may be improperly received at the target transceiver, necessitating a retransmission of either the packet of data or the complete payload from the source transceiver. Recoveries from such a delay or loss of data may be expensive because this may involve additional time and use of resources. As a result, reliability and speed of data transmission may drop below an acceptable level. Under these circumstances, wireless communication systems may offer significantly reduced robustness and data transmission rates than generally desired, especially for a short-range wireless communication link.

Thus, there is a continuing need for better ways to support wireless communications over a communication link.

DETAILED DESCRIPTION

Wireless communications systems transfer data over wireless links. On example of a wireless link is a receiver/transmitter pair that provides point-to-point communications between two devices. Wireless links may also provide point to multi-point communications between devices. Data transfers over wireless links may take place in small units such as packets. The packet sizes used by a specific wireless communications system are typically determined by the one or more features of the wireless link including data rate, retransmission latency, frequency accuracy, error correction efficiency, noise susceptibility, and regulation. Applications use wireless communications systems to send and receive data in payload sized units. The payload sizes used by specific application are commonly determined by the requirements of the application and the system that it runs on. For example, application latency, native application data sizes and/or system buffer sizes may determine payload size. Additionally, an application may have Quality of Service (QoS) requirements, which demand that payloads are delivered with agreed upon latencies and/or bandwidth. A channel provides a managed communications path between applications, or between an application and a desired target of its communication. One or more channels may be allocated to an application. A wireless communication system may support multiple channels on a single wireless link, sending and receiving payloads for multiple applications. A wireless communication system may allow independent QoS requirements to be set for each channel. Support for the diverse demands of multiple applications and radio technology constraints may be provided in a wireless communication system in accordance with some embodiments of the present invention.

Figure 1:
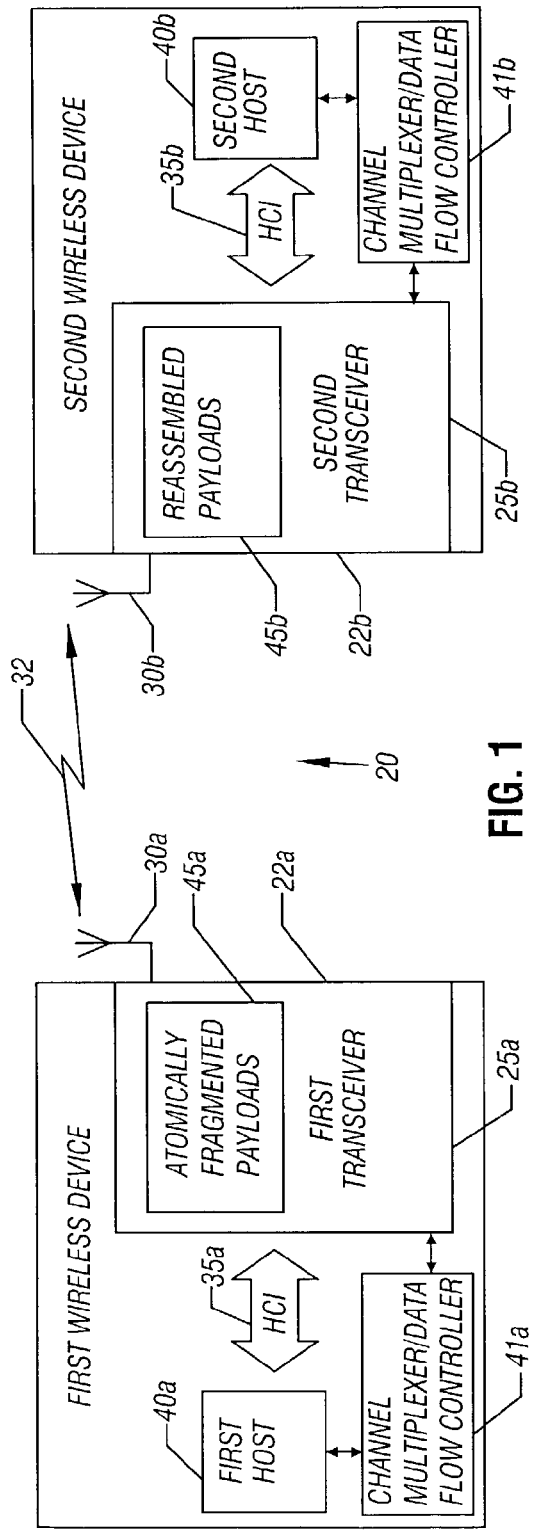
FIG. 1 is a schematic depiction of a wireless communication system in accordance with one embodiment of the present invention.

Consistent with one embodiment of the present invention, a wireless communication system 20 as shown in FIG. 1 comprises a first wireless device 22a capable of wirelessly communicating with a second wireless device 22b. The first wireless device 22a may comprise a first transceiver 25a operably coupled to an antenna 30a to communicate with the second wireless device 22b over a short-range wireless communication link 32. Likewise, the second wireless device 22b may include a second transceiver 25b communicatively coupled to an antenna 30b that may receive and transmit wireless communications over the short-range wireless communication link 32. Examples of the first and second wireless devices 22a and 22b include a processor-based system such as a desktop computer, a laptop computer, a server, or any of a variety of other computers, peripherals, processor-based devices, cellular phones, portable devices, or access points to a network (e.g., a public switched telephone network (PSTN).

While the first wireless device 22a may be physically separated from the second wireless device 22b, the first transceiver 25a may be capable of transmitting to and receiving from the second transceiver 25b, wireless communications including multiple data units. Examples of the data units include packets of data which may carry control information, data or other media (e.g., video, audio), security data, or data integrity bits over the short-range wireless communication link 32. An example of the antenna 30a, 30b is a dipole antenna.

Similarly, examples of the transceivers 25a and 25b include a processor-based device, or any one of a variety of other peripheral devices capable of wireless communications using voice, video and/or data circuitry over the short-range wireless communication link 32. These wireless communications may provide a wireless interconnect between small mobile devices and their peripherals, as an example by replacing cable used on mobile devices with radio frequency waves.

Each of the wireless devices 22a may further comprise a host controller interface (HCI) 35 to operably couple a respective transceiver of the first and second transceiver 25a and 25b to an associated host of a first host 40a and a second host 40b, respectively. In operation, each HCI 35 may provide a serial or parallel communication link, such as a bus between the transceiver 25 and the host 40, as an example.

To indicate various features of some embodiments of the present invention, only relevant components of the short-range wireless communication system 20 are illustrated in FIG. 1 according to one embodiment. Of course, without limiting the scope of the present invention, the system 20 may comprise similar and/or additional components in other embodiments.

For example, the first wireless device 22a may include a link manager and input/output (I/O) circuitry module for operating the first transceiver 25a in accordance with one embodiment of the present invention. The first wireless device 22a may use the HCI 35a to operably couple the first host 40a with the first transceiver 25a via the link manager and I/O circuitry module. While the link manager of the module may be executed by a microcontroller (not shown), the I/O circuitry in the module may be responsible for driving the first transceiver 25a. For example, the first transceiver 25a may include conventional baseband hardware for digitally processing communication signals to and from the antenna 30a, and a radio frequency front-end to perform analog processing of such communication signals.

In operation, the wireless communication system 20 may provide voice, video, and/or data communications as data units, such as payloads of data. Each payload of data may include one or more packets of data that may be exchanged between wirelessly networked first and second wireless devices 22a, 22b. Each payload of data may be broken into one or more fragments at the first wireless device 22a, using the channel multiplexer/data flow controller 41a, as an example. Such fragments may be portions of data that may be communicated independently as an atomic unit. For example, one fragment may comprise a header portion of a payload and another fragment may include a data portion of the same payload. The size of a fragment may depend on a variety of constraints including the size of the packets on the wireless link, the size of the data units used to communicate with the HCI 35, the rate at which packets are delivered over the wireless link, and the QoS latency and bandwidth settings of the channel. The fragment size may be selected to optimize the performance of all active channels and their ability to meet their QoS requirements in some embodiments of the present invention.

For transmission purposes, fragments of atomically fragmented payloads 45a may be provided to the first wireless device 22a in one embodiment of the present invention. Over the short-range wireless communication link 32, these atomically fragmented payloads 45a may be transmitted from the first transceiver 25a to the second transceiver 25b. At the second transceiver 25b, the fragments of the atomically fragmented payloads 45a may be combined to form reassembled payloads 45b. In this way, both the channel multiplexer/data flow controllers 41a and 41b may cooperatively provide multiplexing and flow control at a fragment granularity while transferring the atomically fragmented payloads 45a over the link 32 for subsequent reassembly as the reassembled payloads 45b.

Figure 2:
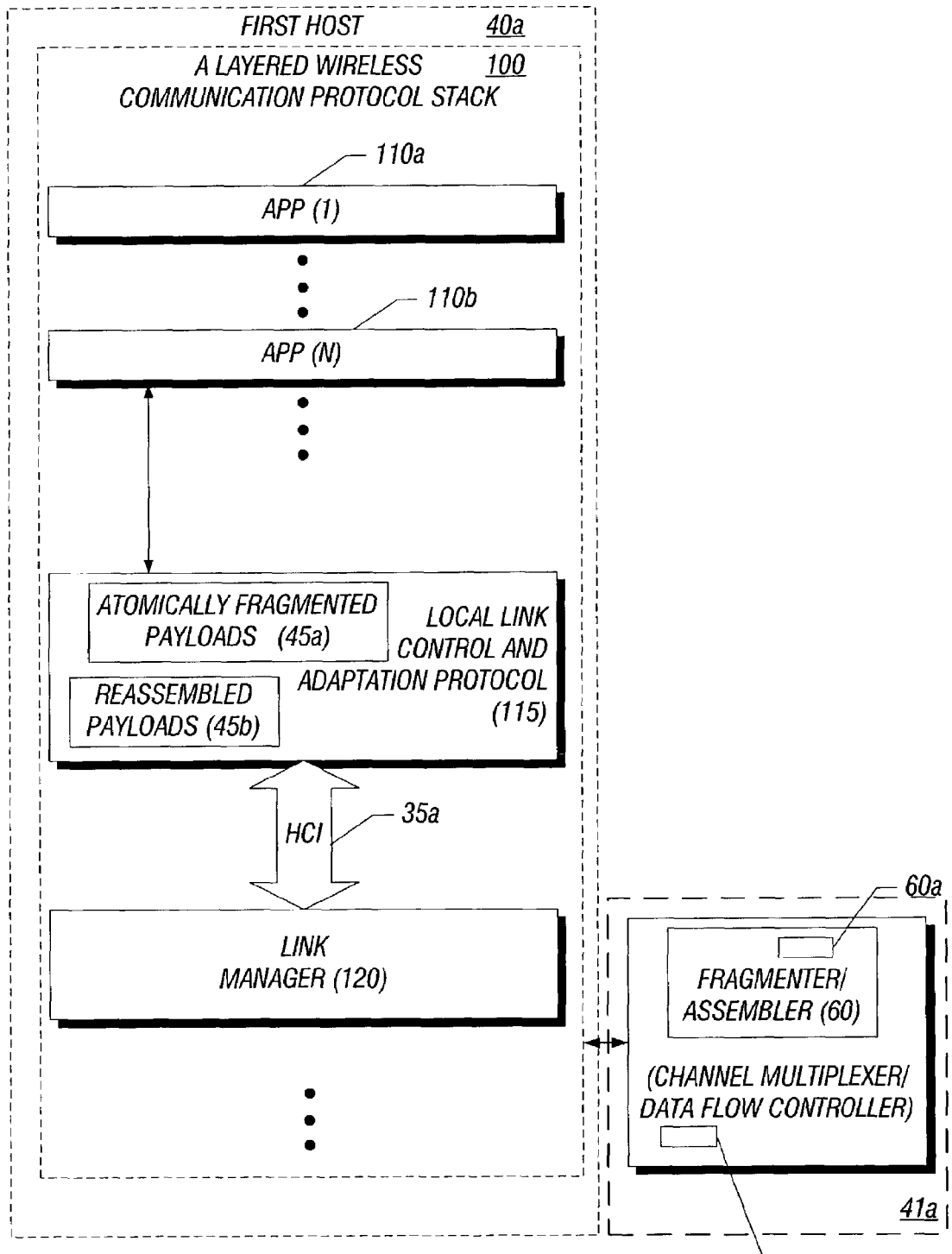
FIG. 2 is a schematic depiction of a wireless short-range communication system that incorporates channel multiplexing and flow control over a short-range radio link consistent with one embodiment of the present invention.

According to one embodiment, the first host 40a as shown in FIG. 2 may use the channel multiplexer/data flow controller 41a to wirelessly communicate with another wireless communication device, such as the second wireless device 22b via an air interface (e.g. the link 32 in FIG. 1). In the illustrated embodiment, the channel multiplexer/data flow controller 41a includes a fragmenter/reassembler 60 to atomically fragment and subsequently assemble payloads being communicated. First, to break a payload into one or more fragments, and then to label each of the fragments, an associated logic 60a may be provided. To incorporate channel multiplexing and flow control while communicating a fragmented payload of the atomically fragmented payloads 45a, the channel multiplexer/data flow controller 41a may further comprise an associated logic 41c.

In addition, the first host 40a may operate based on a layered wireless communication protocol stack 100 for receiving and/or transmitting the atomically fragmented payloads 45a. The layered wireless communication protocol stack 100 may include a plurality of application (APP) programs 110a through 110b, a local link control and adaptation protocol L2CAP 115, and a link manager 120 in some embodiments. The host controller interface (HCI) 35a may enable interfacing of the L2CAP 115 with the link manager 120. In one embodiment, the L2CAP 115 may support channel multiplexing, packet segmentation and reassembly. The application programs 110a through 110b by assist in data packet formation and composition.

In one embodiment, each fragment of a payload may be labeled by the fragmenter/assembler 60 such that every fragment uniquely links to only one specific payload within a packet being communicated over a particular channel. For the purposes of labeling and subsequent reassembly, each fragment of a payload may be identified at least one of a beginning fragment and an ending fragment relative to the payload.

Figure 3:
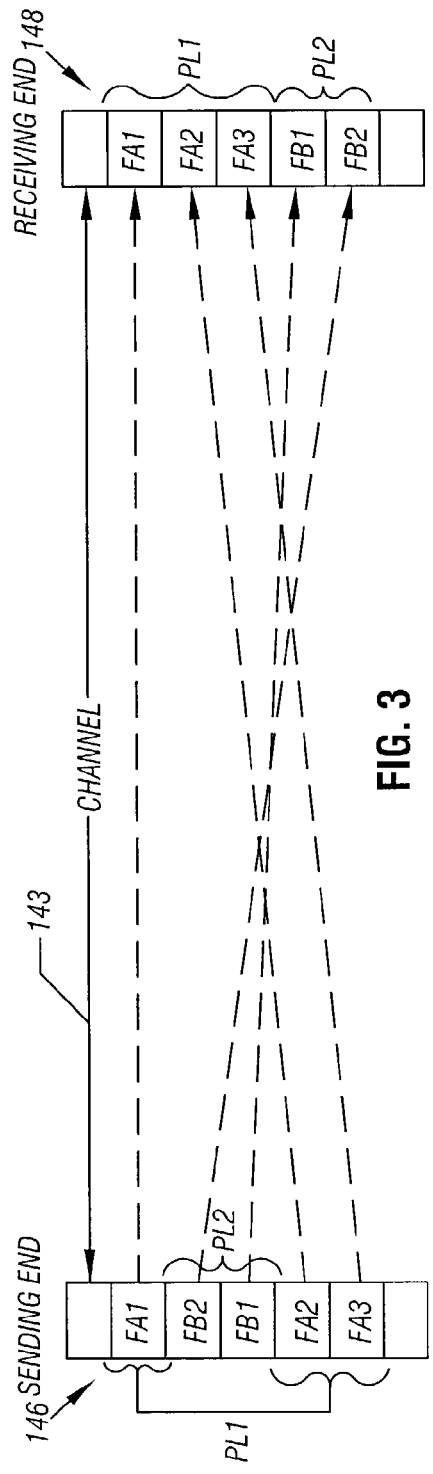
FIG. 3 is a schematic depiction of an embodiment of the present invention.

Over a communication channel 143, as shown in FIG. 3, a wireless transfer of payloads PL1 and PL2 of data from a sending end 146 to a receiving end 148 may be enabled by the fragmenter/assembler 60 shown in FIG. 2 in accordance with one embodiment of the present invention. In some embodiments, each payload may be broken into atomic data units, such as fragments before sending onto the communication channel 143. In particular, the payload P1 may be segmented in a first set of fragments FA1, FA2, and FA3, as an example. Likewise, the payload PL2 may be divided in a second set of fragments FB1 and FB2.

In operation, each payload in the atomically fragmented payloads 45a (FIG. 2) block are breakable into one or more associated fragments which may be identified as one of start, continue, end or single fragment relative to that payload and logical channel. For instance, a payload comprising at least one packet in the local link control and adaptation protocol (L2CAP) 115 (FIG. 2) may be segmented into one or more fragments. Each of such fragments (e.g. FA1, FA2 and FA3) may be labeled depending upon the number of fragments created for a particular payload.

As shown in FIG. 2, within the L2CAP 115, the first host 40a may process the fragmented payloads PL1 and PL2 for transmission based on the channel multiplexer/data flow controller 41a. The layered wireless communication protocol stack 100 may enable the application 110b to open one or more channels for the first wireless device 22a. In addition, the channel multiplexer/data flow controller 41a may enable the L2CAP 115 to provide flow control when multiple channels are used according to one embodiment of the present invention. In this way, data multiplexing and flow control (e.g. based on the conventional sliding window technique) may be applied to the wireless transfer of voice, video and/or data over the short-range wireless communication link 32 (FIG. 1). For some embodiments of the present invention, the payloads PL1 and PL2 may be transmitted on the link 32 in a desired data and/or packet streaming session.

Other embodiments may involve use of different layers within the layered wireless communication protocol stack 100. In addition, while embodiments of the present invention are described in connection with multiple payloads segmented into on or more fragments, the present invention is applicable to any type of data or media and with any number of data units. A peer-to-peer or a master-slave configuration may be deployed in the wireless communication system 20 for wireless communications between a variety networked wireless devices or systems in accordance with some embodiments of the present invention.

A different label may indicate a fragment type based on a relative temporal position of a particular fragment within a payload length according to one embodiment of the present invention. Each fragment may be associated with a unique label, indicating whether it is a first, intermediate, or a last fragment of a payload. In particular, a hexadecimal code may be provided in a predetermined field within each fragment. For each fragment, a different code may be used for labeling purposes including a continue label code, a start label code, an end label code, and a single label code.

Multiple logical channels may be used to communicate multiple payloads in one embodiment. However, these logical channels may be associated with one communication link 32 (FIG. 1). Payloads from different channels may be divided into fragments and the fragments can be multiplexed, allowing high priority, low latency L2CAP 115 channels to interrupt large payloads on low priority L2CAP 115 channels. For two channels, A and B, a simple nesting scheme may capture the fragments of a channel A until an end or a start fragment is received in some embodiments. If an end fragment is received, then the payload of channel A is complete and may be delivered to a receiving application. However, if a start fragment is received then payload A is not complete, and capturing of channel A data may be suspended. The first fragment of a payload typically includes an L2CAP header, which identifies the channel that a fragment is received, the payload for channel B may be delivered and the device may return to capturing fragments for channel A. If another start fragment is received before the termination end fragment then the nesting process starts all over again.

Figure 4:
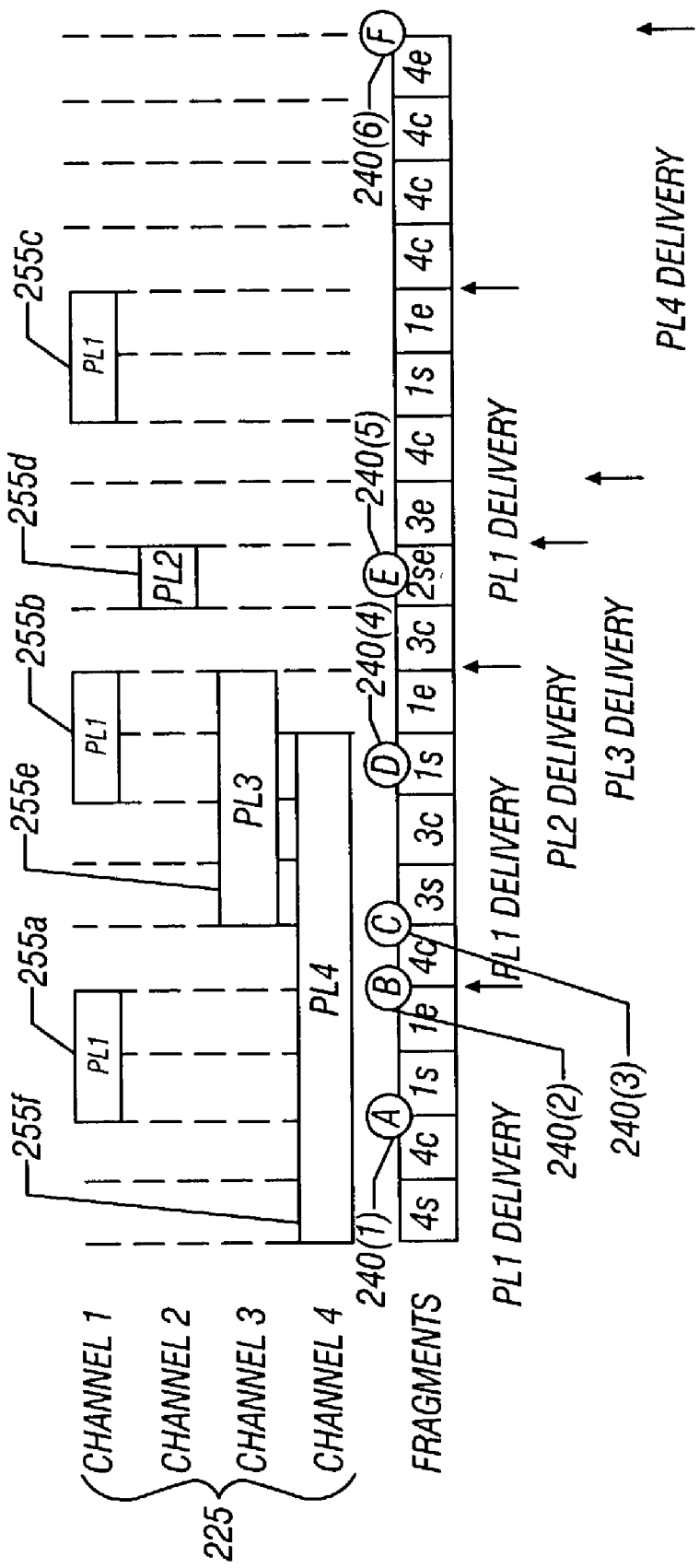
FIG. 4 shows a hypothetical timing chart of channel multiplexing and flow control based on fragments according to one embodiment of the present invention.

A hypothetical timing chart in FIG. 4 shows channel multiplexing and flow control for a plurality of open logical channels 225. Four open logical channels 225 are included in the illustrated embodiment. Specifically, the channel 1 may over time carry one or more payloads 255a through 255c, such as PL1 shown in FIG. 3. Likewise, the channel 2 may carry a payload 255d, such as PL2 shown in FIG. 3. While payload PL3 255e may be carried by the channel 3, the channel 4 may carry a payload 255f which is indicated as PL4. Each of the open logical channels 225 may have a priority associated therewith, facilitating channel multiplexing.

Each of the payloads 255, i.e., PL1 through PL4 may be fragmented and transmitted using the four open logical channels 225, operating in a multiplexed manner. The notation used to indicate each fragment is Ct, where "C" indicates the channel number and "t" the type of the fragment. In the illustrated embodiment, fragment types include: "s=start", "c=continue", "e=end", and "se=single." The length of each payload (255a through 255f) in FIG. 4 is proportional to the number of fragments that it will take to transmit the complete payload. The length of each payload is indicative of when the payload would have been delivered if there had been no payloads posted by higher priority channels. However, since all payloads are multiplexed on to a signal communication channel (e.g., the communication channel 143 shown in FIG. 3) the delivery times (as shown by arrows) may be delayed in the illustrated embodiment of FIG. 4. For example, the payload PL4 comprises only eight fragments but takes nineteen fragment lengths (vertical dotted lines) to deliver as shown by an arrow on the right extreme end of FIG. 4.

To enable a flow control that provides prioritization of "high" priority channels over "low" priority channels, the low priority channels may be selectively paused. At each instance of such pauses (A) through (F), fragments in high priority channels may be allowed to proceed. In particular, a plurality of channel pause instances 240(1) through 240(6) are indicated in FIG. 4, as examples, according to one embodiment of the present invention.

In operation, the four channels 225 may post various payloads to an L2CAP interface. These channels may be associated with one device or multiple devices. Each payload is segmented into fragments and these fragments may be scheduled as function of channel priority. In this example, channel 1 is of the highest priority channel, and the channel 4 is of the lowest priority.

In operation, the channel 4 posts a low priority payload, such as payload, PL4, 255f that fits into eight fragments, as an example. While the channel 4 payload, PL4, is being transmitted, a high priority, two-fragment payload, PL1, 255a is posted on channel 1. The reception of the channel 1's start fragment (1s) before the reception of a channel 4 end fragment (4e) at the (A) channel pause instance 240(1) may cause the process of collecting fragments for the channel 4 payload, PL4, 255f to pause when the fragments for the new, higher priority payload are received. The end fragment (1e) marks the end of the channel 1 payload at the (B) channel pause instance 340(2). The reception of a subsequent continue fragment causes the collection of channel 4 fragments (4c) to resume. Fragments from a payload posted to channel 3 cause channel 4 to pause again at the (C) channel pause instance 240(3). Likewise, fragments from a payload posted to channel 1 cause channel 3 to pause at the (D) channel pause instance 240(4). As the end fragments for each of the respective payloads are received, the payloads are delivered to the L2CAP 115 layer on the receiving end.

The channel 2 at the (E) channel pause instance 240(5) is an example of a payload that fits in a single fragment (2se). A single fragment is in essence a combined start and an end fragment. Due to the traffic from higher priority channels, the final delivery of the channel 4 payload at the (F) channel pause instance 240(6) is significantly delayed.

Figure 5:
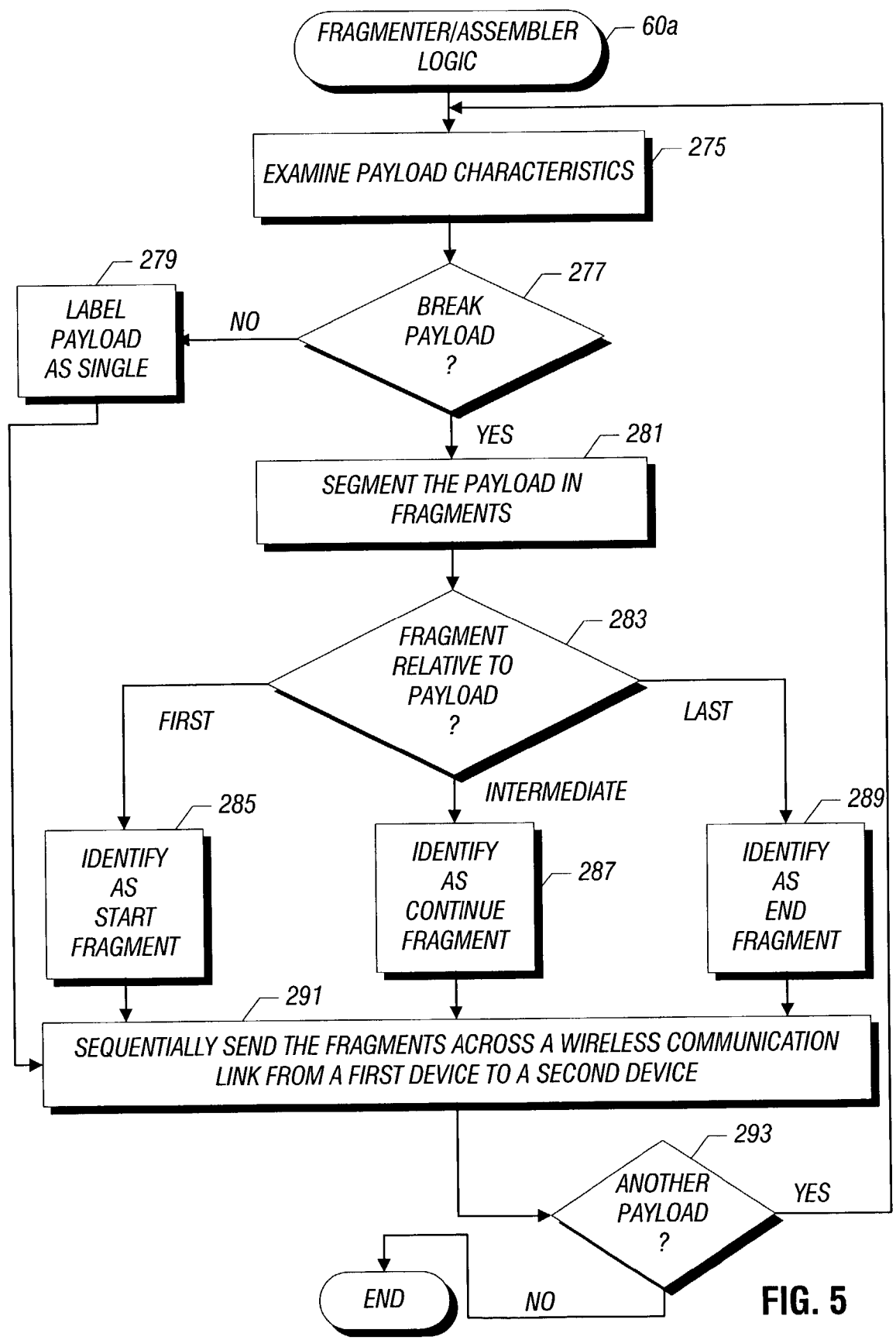
FIG. 5 is a flow chart for software, which accompanies an embodiment of the present invention.

Fragmenter/assembler logic software 60a as shown in FIG. 5 may process one or more payloads through the L2CAP 115 (FIG. 2). In response to a call from the application 110b of FIG. 2, a data payload which may be broken into one or more packets, may be prepared for transmission by the fragmenter/assembler logic software 60a. More specifically, in one embodiment, one or more payload characteristics such as the length of the payload may be determined at block 275. Based on the payload length, a check at diamond 277 may determine whether or not to break the payload. If the payload length is such that the payload may fit in one fragment length, then the payload may be labeled as a single fragment at block 279. On the other hand, if the payload is determined to be long enough for breaking into fragments, then the payload may be segmented in at least two fragments depending upon the payload length at block 281.

To determine a number of fragments in which the payload may be segmented and to indicate each fragment relative to the payload, a check may be performed at diamond 283. When a fragment is determined to be the first fragment, the fragment may be identified as a "start fragment (s)" at block 285. Otherwise, if a fragment is an intermediate fragment, it may be identified as a "continue fragment (c)" at block 287. Alternatively, if the fragment happens to be the last fragment of the payload under processing, then that fragment may be identified as an "end fragment (e)" at block 289.

After identifying each fragment individually, the identified fragments may be communicated independently as atomic units over the communication channel 143 (FIG. 3). In this way, the available single (se), start (s), continue (c) and the end (e) fragments may be prepared for a multiplexed and controlled wireless transmission. In one embodiment, at block 291, all the earlier identified fragments may be sent (e.g. sequentially) across the short-range wireless communication link 32 from a first device, i.e., the first wireless device 22a to the second wireless device 22b both of FIG. 1. A check at diamond 293 may determine whether or not another payload is to be fragmented. If present, a subsequent payload may be fragmented by the software 60a. The fragmenter/assembler logic software 60a may iteratively process such payloads at the block 275.

Figure 6:
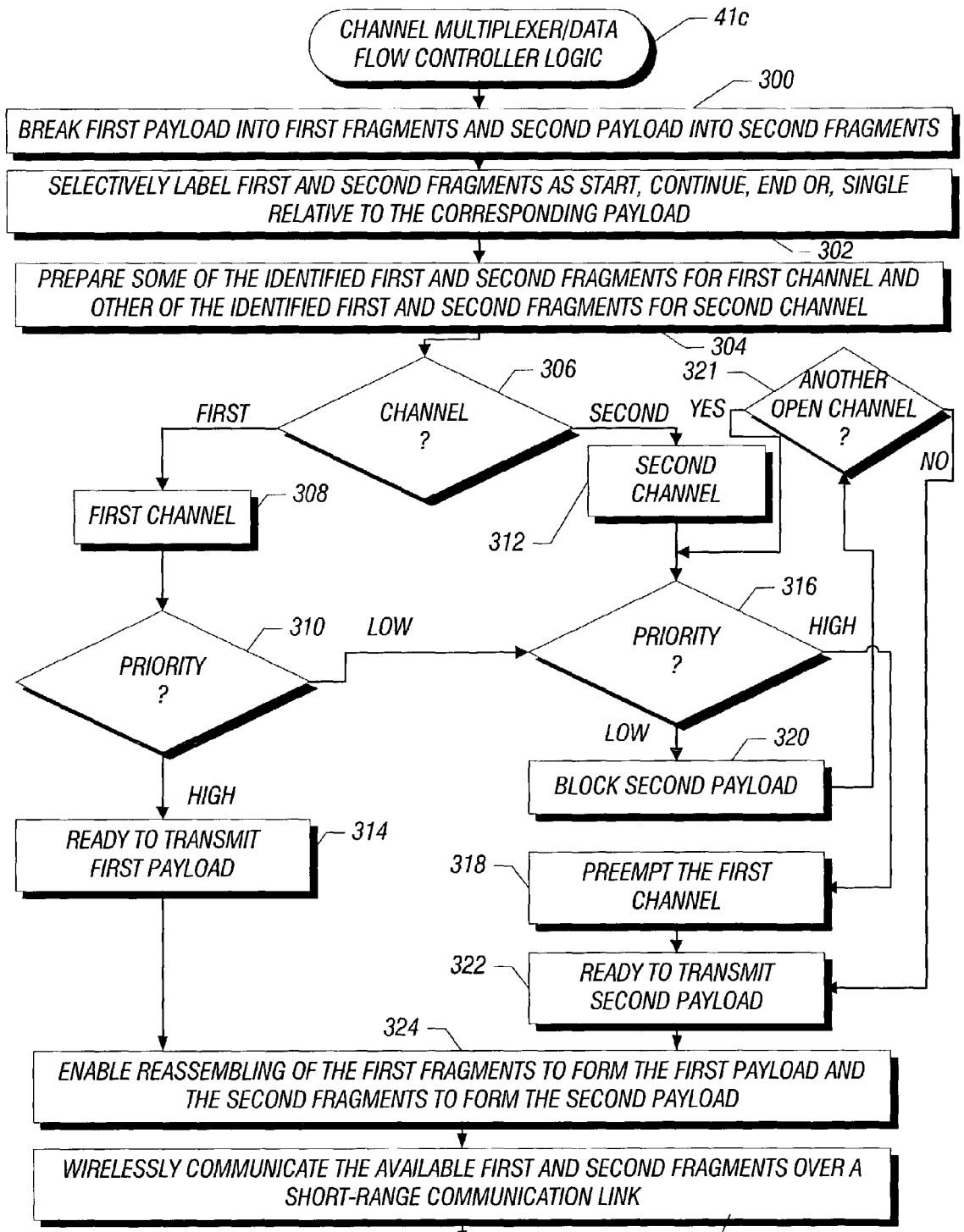
FIG. 6 is a flow chart for software, which accompanies another embodiment of the present invention.

Channel multiplexing and data flow control logic software 41c corresponding to the channel multiplexer/data flow controller 41a of FIG. 2, is shown in FIG. 6. The software 41c may enable a fragment-based multiplexing between high and low priority channels for L2CAP 115 (FIG. 2) while supporting flow control between payloads over these channels. In one case, a first and a second payload may be broken into corresponding fragments at block 300. More particularly, the first payload may be segmented into a set of first fragments and the second payload may be divided into a set of second fragments.

Using the fragmenter/assembler logic software 60a of FIG. 5, each of the first and second fragments may be labeled as either a start (s), continue (c), end (e), or single (se) fragment with reference to the beginning of the corresponding payload at the block 302. At block 304, the L2CAP 115 may prepare some of the identified first and second fragments for a first channel and other identified first and second fragments for a second channel.

To prioritize the transfer of one payload against the other between the first and second payloads, a check at diamond 306 may identify the channel on which a particular payload may be transmitted. If the channel is determined to be a channel one, at the block 308, a further check at diamond 310 may determine the priority of the channel one with respect to any other open channels, such as a channel two. Alternatively, if the channel is determined to be the channel two, then it's priority may be conditionally determined at diamond 316.

When, the priority of the channel one is determined to be "high" at the diamond 310, the first payload may be prepared for transmission at block 314. Conversely, responsive to the priority of the channel one being determined to be "low" priority relative to at least one other open channel, i.e., the channel two, the channel two may be considered at block 316. That is, if the channel one is indicated to be of "low" priority only then the channel two may be considered. In any event, if no other channels are open, then this check at the block 316 may be skipped. However, if other channels are open, then the priority of the channel two may be compared to the other open channels. In this way, when the channel two happens to be of the highest priority among other open channels, then the channel one may be preempted at block 318. Otherwise, the second payload may be blocked from proceeding with subsequent transmission at block 320 in response to the channel two being determined to be of "low" priority relative to at least one open channel in a check at diamond 321. If there are no other open channels then the second payload may be prepared for transmission at block 322.

When at least one of the first and second payloads is ready for transmit, respective fragments may be enabled for eventual reassembly at block 324, i.e., appropriately portioned in baseband packets for transmission. In one embodiment, any available first and second fragments may be wirelessly communicated over a short-range communication link at block 326.

Figure 7:
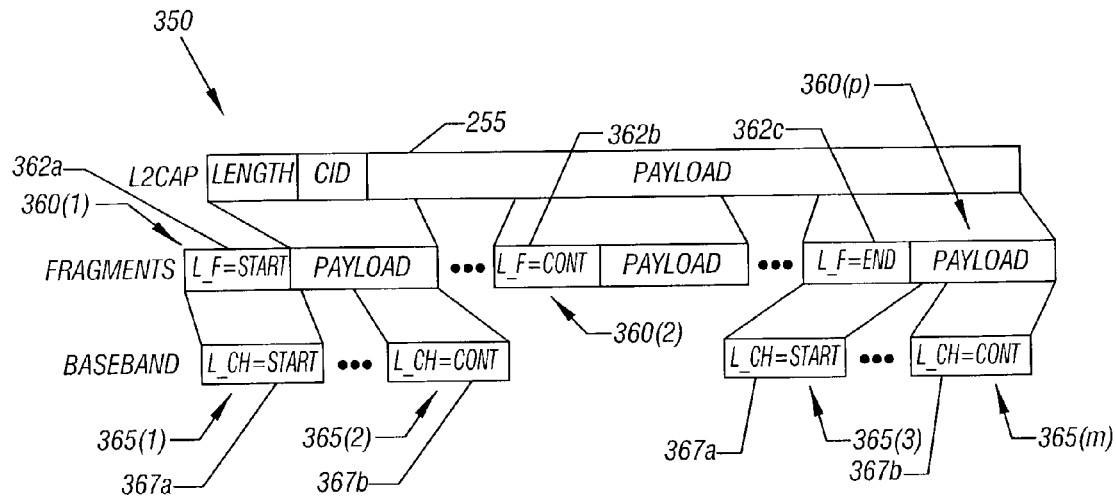
FIG. 7 is hypothetical showing of a payload segmented in fragments for a subsequent reassembly in accordance with one embodiment of the present invention.

A hypothetical depiction of a fragmentation scheme 350 according to one embodiment of the present invention is shown in FIG. 7 for the payload 255 as depicted at the L2CAP 115 layer. The payload 255 may be segmented in multiple fragments 360(1) through 360(p) as discussed earlier. For the baseband level, each fragment may further be broken into baseband packets 365(1) through 365(m). The payload 255 may use one or more payload associated features. Namely, a channel identification (CID) parameter, a length parameter as examples. The CID parameter may represent a local end-point of the communication channel. The length parameter may indicate size, in bytes of payload data to be transmitted. Alternatively, in another embodiment, fragmentation may be applied to an HCI level, where payloads are broken into fragments and delivered to an HCI level which further divides the fragments into HCI specific data units (chunks). Hence, the baseband level may be substituted with an HCI level, or an HCI level may be inserted between the fragments level and the baseband level.

Using the fragmentation scheme 350, an application program, such as the APP 110b of FIG. 2 may implement flow control at a lower granularity than a payload sized granularity because the L2CAP 115 payloads may be segmented into fragments. For L2 CAP 115, a fragment flag (L_F) 362 defines four types of fragments using fragment flags "L_F" including start 362a, continue 362b, end 362c, and optionally single (not shown) in one embodiment. A single fragment may be used for relatively small data transfers; in essence, it is a combined start and end fragment. Each fragment 360 may be further divided to form baseband packets 365, where the first baseband packet 365(1) associated with the fragment 360(1) has the payload header with a logical channel flag (L_CH) set to a start code as "L_CH=start" 367a. Similarly, another logical channel flag "L_CH=continue" 367b may indicate a continue baseband packet 365(2). After the start baseband packet 365(1) is sent, one or more continue baseband packets 365(2) may be sent to a device until the complete fragment 360(1) is transmitted. Each fragment 360 may include a header in one embodiment.

Figure 8A:
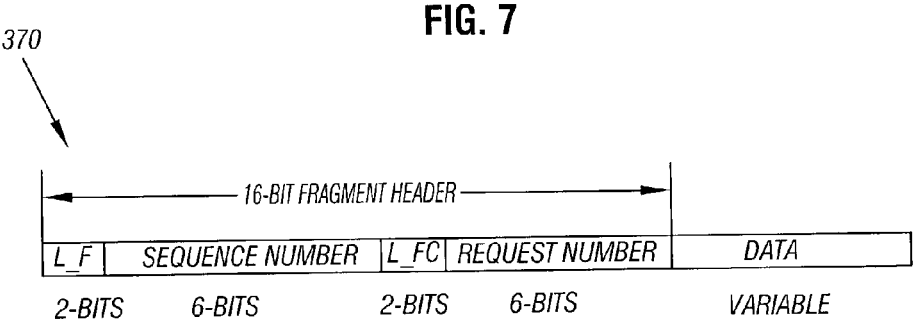
FIG. 8A is a schematic depiction of a fragment header, which allows flow control to be applied to fragments according to one embodiment of the present invention.

A schematic depiction of a fragment header 370 is shown in FIG. 8A, which allows flow control to be applied to fragments of the payloads 255a through 255f shown in FIG. 4 according to one embodiment of the present invention. Additional fragment header information may allow flow control to be applied to fragments in some embodiments. With flow control a fragment header is 16-bits in size, where a 2 bit field is defined for a fragment type field (L_F). A fragment sliding window flow control may be accomplished with the addition of flow control flags (L_FC), fragment sequence numbers, and fragment request numbers in one embodiment. Managing flow control at the fragment level may significantly reduce the impact on baseband implementations. For baseband packet flow control, the flow control information may be ideally included in every baseband packet 365 (FIG. 7) in some embodiments. Flow control at the fragment level, however, allows the overhead of the flow control information to be distributed over several baseband packets (e.g., 365(1) through 365(m)).

Figure 8B:
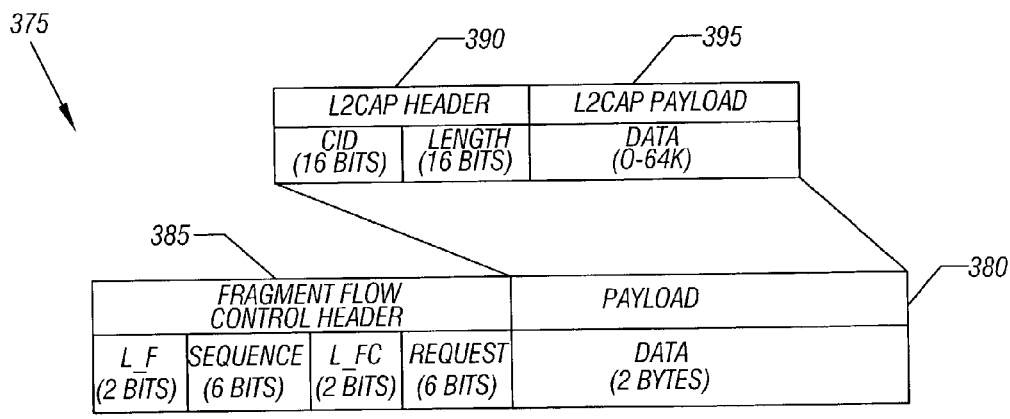
FIG. 8B shows a layout of a data fragment useful for flow control in accordance with one embodiment of the present invention.

A layout of a data fragment 375, as shown in FIG. 8B includes a flow control header 385 that precedes a flow-controlled payload 380 in one embodiment. The header 385 may be divided into four fields including a 2-bit fragment type filed (L_F), a 2-bit flow control payload field (L_FC), a 6-bit sequence number filed, and a 6-bit request number field. The flow-controlled payload 380 includes a L2CAP header 390 and a L2 CAP data payload field 395 so that data integrity of the transmitted data fragment 375 may be ensured via an acknowledgment and retransmission mechanism in some embodiments of the present invention.

According to one embodiment, the flow control payload field includes data from higher layer message exchanges. In the sequence number filed, successive connection management data fragments may be numbered and this number is placed in the sequence number field of the outgoing data fragment in one embodiment. In the request number field, the value of the next sequence number which the sender of the data fragment 375 is expecting to receive from its peer device may be provided. The request number may serve an implicit acknowledgment for all data fragments with sequence numbers less than the number in the request number field. By piggybacking the request number on an outgoing data fragment, the throughput efficiency of a piconet may be significantly improved in one case.

Additional fragment information may allow error checking, or error checking and correction, to be applied to fragments in some embodiments. With error checking a cyclic redundancy checking (CRC) field or other error checking information may be added to the fragment 375. Managing error checking/correction at the fragment level may significantly improve the robustness of baseband implementations. For baseband packet error checking/correction, the error checking/correction information may be ideally included in every baseband packet 365 (FIG. 7) in some embodiments. Error checking/correction at the fragment level, however, allows the overhead of the error checking/correction information to be distributed over several baseband packets (e.g., 365(1) through 365(m)).

In one embodiment, the short-range wireless communication link 32 (FIG. 1) may enable a radio link on a microwave carrier frequency (e.g., 2.4 gigahertz (GHz)) capable of a transmission range about ten meters with a transmit power of about one milliwatt between a master wireless communication device to a slave wireless communication device. Additionally, a packet of data may include one or more payloads being exchanged between at least two wirelessly networked devices or systems. The first and second wireless communication devices 22a and 22b may be based on any one of a variety of conventional radio links that may be utilized for wireless communications. One radio link is the Bluetooth radio link, which is a short-range, cable replacement, radio technology. Bluetooth standards are set forth by the Bluetooth special interest group (SIG) in a specification entitled "Specification of the Bluetooth System, Volume 1: Core and Volume 2: Profiles," version 1.1, February 2001.

Using the 2.4 GHz instrumentation, science, medical (ISM) unlicensed band, a Bluetooth standard-based wireless communication system may provide a point-to point connection between two Bluetooth units involved in a communication session and a point-to-multipoint connection amount a plurality of Bluetooth units. Two or more such units sharing the same channel form a "piconet," where the unit controlling the traffic is the master and the other units are slaves. There may be multiple piconets with overlapping coverage areas, a configuration called a "scatternet." Each piconet may only have one master. Slaves, however, may participate in different piconets on a time-division multiplex basis, and a master in one piconet may be a slave in another.

The Bluetooth wireless communication system may employ channels that use a frequency-hop/time-division-duplex (FH/TDD) technique, accommodating transfer of both voice and data. The voice and/or data to be transmitted as portioned into packets. A number of packet types (with different lengths, as example) may be defined. Depending on packet length, a packet may be transmitted in one, three or five slots. For example, a three or five slot packet uses the hop frequency of the first slot for all remaining slots, then the hop sequence picks up where it would have been if it had been hopping every slot.

A master device (e.g. the first host 40a) may manage multiple slave devices (e.g. including the second wireless device 22b) according to one embodiment of the present invention. The master device may communicate with slave devices sequentially, such as by polling each slave device in a round robin manner. Of course, depending upon a particular application other appropriate mechanisms for communicating with the slave devices may be deployed in some embodiments. In one case, for example, a piconet may include a particular master host device that may poll a plurality of slave radio devices associated with the piconet. In one embodiment, any one of a plurality of networked devices or systems in the piconet, i.e., the first and second wireless devices 22a and 22b may be designated or arbitrated to be either a master or a slave device.

Each of the first and second wireless devices 22a and 22b may be set to a nominal range of 10 meters augmentable with an external power amplifier to up to 100 meters.

Seventy-nine hop frequencies are utilized beginning at the lowest frequency which is 2402 MHz and each of the 79 hop frequencies is 1 MHz above the next lower frequency. A connection may be made between the first host 40*a* and the second wireless device 22*b* by sending a page message. A page message may include a train of 16 identical page messages on 16 different hop frequencies.

Consistent with some embodiments of the present invention, the wireless communication system 20 may use the synchronous communications (SCO) link for point-to-point, full duplex links, normally used in voice communication. For the embodiment described herein, the asynchronous communications link (ACL) is used. The ACL provides one frame duration links with full duplex communications. The ACL communications use a time division duplex scheme. A first slot provides a transmission from the master to the slave and a second slot provides a transmission from the slave to the master. Each slot is transmitted on a different hop frequency. The device initializing the transmission is designated the master and the device receiving the transmission is designated the slave.

Each of the host devices 40*a* and 40*b* of the wireless communication system 20 may include additional circuitry for performing the baseband processing and the basic protocols close to the physical layer such as the error correction coding and an automatic repeat request (ARQ). The ARQ provides an acknowledgement to the master, in response to a transmission in one slot, in the next following slot which comes from the slave and vice versa. The short-range wireless communication system 20 may further use appropriate modulation with data and symbol rate of one megasamples per second.

In one embodiment, L2CAP 115 payloads are segmented into fragments so that each fragment is handled as an atomic unit by L2CAP layers, vs. the way that whole L2CAP payloads are conventionally handled. A fragment may comprise one or more HCI chunks, or one or more baseband packets. After each fragment is transmitted, the L2CAP 115 layer may transmit another fragment for the same channel, or additionally or alternatively a fragment for another channel. Fragments may be reassembled at the receiving end into L2CAP 115 payloads. Flow control may be applied to the payload of one channel, without blocking the payload of another channel.

Fragments may be limited in size to the amount of data that may be transmitted in a period for which a particular device may be selected to communicate. This granularity may allow efficient multiplexing of L2CAP 115 channel data, irrespective of the L2CAP 115 payload size, while at the same time reducing system overhead in some embodiments. If limited to the "L2CAP 115 only" layer, fragments may reduce the impact to baseband hardware and firmware, while enabling channel level quality of service (QoS) in one embodiment of the present invention. The L2CAP 115 payloads having fragment granularity may be atomically managed as data segments. Fragment sizes may be multiple of a baseband packet size in some embodiments.

Rather than breaking L2CAP 115 payloads into segments where there is only one start segment per payload, payloads may be broken into fragments, where each fragment is an atomic unit that can be managed by the L2CAP 115. If an HCI (e.g., HCI 35*a*) exists, then fragment may be further split into a start chunk followed by continue chunks. Alternatively, if no HCI exists then fragments may be split into a start baseband packet followed by continued baseband packets. In either case, L2CAP 115 deals with fragments that are smaller than L2CAP 115 payloads but equal to or larger than HCI chunks or baseband packets. In this manner, the L2CAP 115 may be able to multiplex fragments from multiple channels, apply flow control at the fragment level, and limit flush time-out loses to fragment sized data blocks as an example.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    breaking a first payload of data into one or more first fragments at a source transceiver to control multiplexing of said one or more first fragments;
    numbering successive fragments;
    providing a header for each of said first fragments, said header including a first field indicating whether a fragment is a single fragment, a start, intermediate or end fragment and a second field including a request number indicating a next sequence number expected from a transceiver that is the target of the first payload; and
    communicating said first payload over a wireless communication link to a target transceiver.

2. The method of claim 1, including:
    breaking a second payload of data into one or more second fragments;
    identifying each of said one or more second fragments as at least one of a start, intermediate, end or a single fragment; and
    sizing each of said first and second fragments to control latency.

3. The method of claim 2, including:
    logically segmenting said first and second payloads of data at said source transceiver;
    transferring each of said first and second fragments on a communication channel to said target transceiver; and
    reassembling at said target transceiver said one or more first fragments into said first payload of data and said one or more second fragments into said second payload of data for a local link control and adaptation protocol.

4. The method of claim 3, including:
    providing said first payload of data in a first channel;
    providing said second payload of data in a second channel; and
    multiplexing said first and second channels to arbitrate transmission of said first and second fragments.

5. The method of claim 4, including:
    controlling flow of said first payload of data associated with the first channel while blocking said second channel to meet a quality of service metric;
    determining a low and a high priority channel between said first and second channel based on the local link control and adaptation protocol; and
    allowing the high priority channel to preempt the low priority channel.

6. The method of claim 4, including:
    distributing flow control overhead associated with said first channel over said one or more first fragments; and
    distributing flow control overhead associated with said second channel over said one or more second fragments.

7. The method of claim 4, including:
    sizing each of said first and second fragments to control granularity in flow control.

8. The method of claim 4, including:
distributing overhead associated with error checking and correction across each of said first and second fragments.

9. The method of claim 4, including:
enabling a flow control of said first and second payloads of data based on a logical data abstraction;
identifying in the local link control and adaptation protocol a set of upper level layers and a set of lower level layers; and
incorporating said logical data abstraction into said set of upper level layers of the local link control and adaptation protocol.

10. The method of claim 9, wherein said communication channel enabling a radio link between said source transceiver located in a first wireless communication device and said target transceiver located in a second wireless communication device.

11. An apparatus comprising:
a device to break a first payload of data into one or more first fragments, number successive fragments, provide a header for each of said first fragments, said header including a first field indicating whether a fragment is a single fragment, a start, intermediate or end fragment and a second field including a request number indicating a next sequence number expected from a transceiver that is the target of the first payload, and control multiplexing of said one or more first fragments; and
a source transceiver operably coupled to said device to wirelessly communicate said first payload of data over a communication channel.

12. The apparatus of claim 11, wherein said device is a multiplexer capable of controlling data flow and logically segmenting said first payload of data for a local link control and adaptation protocol.

13. The apparatus of claim 12, wherein a target transceiver to reassemble said one or more first fragments to form said first payload of data.

14. The apparatus of claim 13, wherein said multiplexer to:
break a second payload of data into one or more second fragments of data;
size each of said first and second fragments to control latency;
provide said first payload of data in a first channel;
provide of said second payload of data in a second channel; and
multiplex said first and second channels to arbitrate transmission of said first and second fragments while distributing flow control overhead associated with said first channel over said one or more first fragments and distributing flow control overhead associated with said second channel over said one or more second fragments.

15. The apparatus of claim 14, wherein said multiplexer to:
provide flow of said first payload of data associated with the first channel while blocking said second channel to meet a quality of service metric;
determine a low and a high priority channel between said first and second channels based on the local link control and adaptation protocol; and
allow the high priority channel to preempt the low priority channel.

16. The apparatus of claim 14, wherein said multiplexer to:
size each of said first and second fragments to control granularity in flow control.

17. The apparatus of claim 16, wherein said multiplexer to:
distribute overhead associated with error checking and correction across each of said first and second fragments.

18. A processor readable medium storing instructions that, if executed, enable a processor-based system to perform steps including:
breaking a first payload of data into one or more first fragments at a source transceiver to control multiplexing of said one or more first fragments;
numbering successive fragments; and
providing a header for each of said first fragments, said header including a first field indicating whether a fragment is a single fragment, a start, intermediate or end fragment and a second field including a recluest number indicating a next sequence number expected from a transceiver that is the target of the first payload and to communicate said first payload over a wireless communication link to a target transceiver.

19. The medium of claim 18 storing instructions that, if executed, enable the processor-based system to perform steps including:
breaking a second payload of data into one or more second fragments;
identifying each of said one or more second fragments as at least one of a start, intermediate, end or a single fragment;
logically segmenting said first and second payloads of data at said source transceiver to size each of said first and second fragments to control latency;
transferring each of said first and second fragments on a communication channel to said target transceiver; and
reassembling at said target transceiver said one or more first fragments into said first payload of data and said one or more second fragments into said second payload of data for a local link control and adaptation protocol.

20. The medium of claim 19 storing instructions that, if executed, enable the processor-based system to perform steps including:
providing said first payload of data in a first channel;
providing said second payload of data in a second channel;
multiplexing said first and second channels to arbitrate transmission of said first and second fragments;
controlling flow of said first payload of data associated with the first channel while blocking said second channel to meet a quality of service metric;
determining a low and a high priority channel between said first and second channel based on the local link control and adaptation protocol; and
allowing the high priority channel to preempt the low priority channel.

21. The medium of claim 20 storing instructions that, if executed, enable the processor-based system to perform steps including:
sizing each of said first and second fragments to control granularity in flow control while distributing overhead across each of said first and second fragments.

22. The medium of claim 21 storing instructions that, if executed, enable the processor-based system to perform steps including:
enabling a flow control of said first and second payloads of data based on a logical data abstraction;

identifying in the local link control and adaptation protocol a set of upper level layers and a set of lower level layers; and incorporating said logical data abstraction into said set of upper level layers of the local link control and adaptation protocol, wherein said communication channel enabling a radio link between said source transceiver located in a first wireless communication device and said target transceiver located in a second wireless communication device.

23. A wireless communication system comprising:

a device to break a first payload of data into one or more fragments, number successive fragments, and label each of said fragments as at least one of a beginning provide a header for each of said first fragments, said header including a first field indicating whether a fragment is a single fragment, a start, intermediate or end fragment and a second field including a request number indicating a next sequence number expected from a transceiver that is the target of the first payload, and an ending fragment to control multiplexing of said fragments;

a transceiver operably coupled to said device to process said fragments to wirelessly communicate said payload of data; and a dipole antenna to transmit said payload of data over a channel.

* * * * *

UNITED STATES PATENT AND TRADEMARK OFFICE
CERTIFICATE OF CORRECTION

PATENT NO. : 7,277,419 B2  Page 1 of 1
APPLICATION NO. : 10/231712
DATED : October 2, 2007
INVENTOR(S) : Steven B. McGowan It is certified that error appears in the above-identified patent and that said Letters Patent is hereby corrected as shown below:

Column 14:
Line 17, Claim 18, "recluest" should be --request--.

Column 15:
Line 6, Claim 22, "an ending fragment to" should be deleted;
Lines 13 and 14, Claim 23, "and label each of said fragment as at least one of a beginning" should be deleted.

Signed and Sealed this

Twenty-fifth Day of December, 2007

JON W. DUDAS
*Director of the United States Patent and Trademark Office*